(12) United States Patent
Endo

(10) Patent No.: US 7,606,479 B2
(45) Date of Patent: Oct. 20, 2009

(54) IMAGE-TAKING APPARATUS

(75) Inventor: Hiroshi Endo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 504 days.

(21) Appl. No.: 11/474,408

(22) Filed: Jun. 26, 2006

(65) Prior Publication Data

US 2007/0009162 A1 Jan. 11, 2007

(30) Foreign Application Priority Data

Jul. 5, 2005 (JP) .............................. 2005-196111

(51) Int. Cl.
G03B 15/03 (2006.01)
(52) U.S. Cl. ........................ 396/157; 348/371; 362/11
(58) Field of Classification Search ................ 396/157; 348/371; 362/11
See application file for complete search history.

(56) References Cited

U.S. PATENT DOCUMENTS

2005/0174475 A1*  8/2005  Yoshida ...................... 348/370

2006/0257130 A1* 11/2006  Lee et al. ..................... 396/106

FOREIGN PATENT DOCUMENTS

JP      2001-215579 A     8/2001

\* cited by examiner

*Primary Examiner*—W B Perkey
*Assistant Examiner*—Fang-Chi Chang
(74) *Attorney, Agent, or Firm*—Sughrue Mion, PLLC (57) ABSTRACT

A digital camera is provided with an emission section which emits independently controlled light to each of multiple emission areas and a light measurement/distance measurement CPU which calculates the amount of light to be emitted at actual emission based on the amount of reflected light of pre-emission and causes the emission section to perform actual emission with the calculated amount of emitted light. The light measurement/distance measurement CPU causes a relatively large amount of light to be emitted to a part of the multiple emission areas in comparison with the other emission areas when pre-emission is performed.

4 Claims, 12 Drawing Sheets

IMAGE-TAKING APPARATUS

BACKGROUND OF THE INVENTION

1. Field of the Invention

The present invention relates to an image-taking apparatus which is provided with an imaging device and which forms a subject image on the imaging device to generate an image signal.

2. Description of the Related Art

With the advent of a blue light-emitting diode, it has become possible to generate white light with a light-emitting diode, and it is attempted to replace an incandescent lamp which consumes a lot of power with an LED which consumes a little power, in consideration of future reduction of power consumption. This trend is also spreading in the field of digital camera, and the attempt to apply the LED instead of a xenon tube which has been used for fill light is increasingly active.

The LED for fill light is driven by a high current and is easily heated. Accordingly, there is known a technique for sequentially lighting multiple LEDs within an exposure time to shorten the lighting time of individual LEDs and reduce the load posed thereon (see Japanese Patent Laid-Open No. 2001-215579).

High image quality is required from a digital camera, and it is also required to optimize the amount of fill light which has influence on image quality. There is such a digital camera that fill light is composed of pre-emitted light and actually emitted light in order to optimize the amount of light. In this digital camera, it is possible to perform pre-emission and calculate an appropriate amount of light to be emitted at actual emission, based on the amount of light reflected from a subject. However, such a digital camera which performs pre-emission separately from actual emission has a problem of increase in power consumption separately from the problem of the load posed on the LED described above.

In consideration of the above situation, the present invention provides an image-taking apparatus which prevents increase in power consumption.

SUMMARY OF THE INVENTION

The present invention has been made in view of the above circumstances and provides an image-taking apparatus which is provided with an imaging device and which forms a subject image on the imaging device to generate an image signal, the image-taking apparatus being provided with:

an emission section which emits independently controlled light to each of multiple emission areas obtained by two-dimensionally dividing the entire area covering an imaging angle of view; and an emission control section which causes the emission section to perform pre-emission toward a subject prior to actual emission performed when an image is taken, calculates the amount of light to be emitted at actual emission based on the amount of reflected light of the pre-emission and causes the emission section to perform actual emission with the calculated amount of emitted light; wherein the emission control section causes the emission section to emit a relatively large amount of light to a part of the multiple emission areas in comparison with the other emission areas when the pre-emission is performed.

According to the image-taking apparatus of the present invention described above, the emission section emits actually emitted light and pre-emitted light, and at pre-emission, a relatively large amount of light is emitted to a part of emission areas in comparison with the other emission areas by the emission control section.

Here, the phrase "a relatively large amount of light is emitted to a part of emission areas in comparison with the other emission areas" stated above literally means that it is sufficient if a relatively large amount of light is emitted to a part of emission areas in comparison with the other emission areas. The amount of light for the other emission areas except for the part of the emission areas may be relatively low, or the amount of light emitted to each of the other emission areas except for the part of the emission areas may be zero.

The light of actual emission is emitted almost uniformly within the imaging angle of view in order to obtain natural image quality. It is sufficient if the amount of light at the actual emission is to be adjusted to be appropriate for a part of areas within the imaging angle of view, for example, an area including a main part of the subject. Accordingly, when pre-emission for calculating the amount of light emitted at actual emission is performed, a larger amount of light is emitted to the part of emission areas which is to be a target while a small amount of light is emitted to each of the other emission areas. Thereby, it is possible to prevent increase in power consumption in comparison with the case of emitting a large amount of light to all the emission areas while securing the amount of light required for calculation of the amount of light to be emitted at actual emission for the area where the amount of light at the actual emission should be appropriate. That is, according to the present invention, there is provided such an image-taking apparatus that increase in power consumption is prevented.

It is preferable that the image-taking apparatus of the present invention is provided with a distance measurement section which measures the distance to a subject in at least one distance measurement area among the multiple distance measurement areas obtained by two-dimensionally dividing the entire area covering an imaging angle of view; and when the pre-emission is performed, the emission control section causes the emission section to emit a relatively large amount of light to an emission area corresponding to the distance measurement area where distance measurement has been performed by the distance measurement section.

The distance measurement area where the distance measurement section has performed distance measurement is a distance measurement area where the subject is focused best, and it is desirable that the amount of light emitted at actual emission is adjusted to be appropriate in this distance measurement area where distance measurement has been performed. Accordingly, it is possible to prevent increase in power consumption by emitting a large amount of light to an emission area corresponding to this distance measurement area while emitting a small amount of light to each of the other emission areas.

Furthermore, it is preferable that the image-taking apparatus of the present invention is provided with a selection section which selects a distance measurement area in accordance with an operation; and the distance measurement section performs distance measurement for the distance measurement area selected by the selection section.

Thereby, a user can specify a distance measurement area including a portion of a subject which he wants to focus most. In this case, the distance measurement area the user specifies is generally a distance measurement area where it is desirable that the amount of light emitted at actual emission is an optimum amount. Accordingly, by emitting a large amount of pre-emitted light to an emission area corresponding to this distance measurement area while emitting a small amount of light to each of the other emission areas, it is possible to prevent increase in power consumption while securing the amount of light required for calculation of the amount of light emitted at actual emission in the distance measurement area selected by the user.

Furthermore, it is preferable that the image-taking apparatus of the present invention is provided with a face recognition section which recognizes a face position by image processing; and when the pre-emission is performed, the emission control section causes the emission section to emit a relatively large amount of light to an emission area corresponding to the face position recognized by the face recognition section.

It is generally desirable that, at the face position recognized by the face recognition section, the amount of light emitted at actual emission is adjusted to be appropriate. Accordingly, by emitting a large amount of light to an emission area corresponding to this face position while emitting a small amount of light to each of the other emission areas, it is possible to prevent increase in power consumption while securing the amount of light required for calculation of the amount of light emitted at actual emission for the emission area corresponding to the face position.

It is preferable that the emission section of the image-taking apparatus is provided with multiple light-emitting elements which are responsible for emission to the multiple emission areas, respectively.

By causing the multiple light-emitting elements to be responsible for the multiple emission areas, respectively, it is possible to control the amount of light emitted from each light-emitting element to control the amount of light at pre-emission to each emission area. For example, causing the multiple light-emitting elements configured by LEDs to be responsible for emission areas, respectively, it is possible to prevent increase in power consumption while securing a sufficient amount of light in the part of the emission areas described above.

As described above, an image-taking apparatus in which increase in power consumption is prevented is realized according to the invention.

DETAILED DESCRIPTION OF THE INVENTION

An embodiment of the present invention will be described below.

Figure 1:
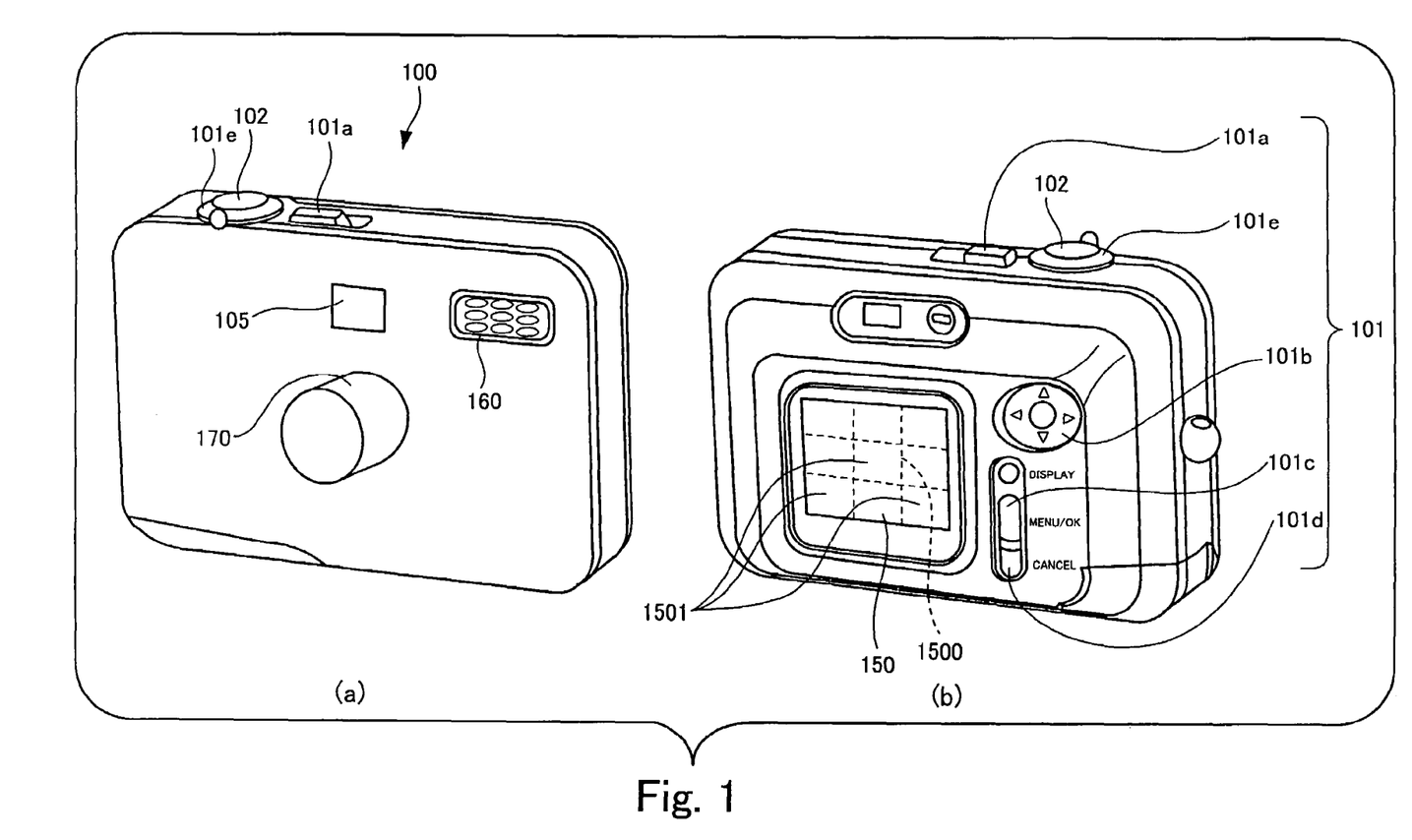
FIG. 1 shows a digital camera which is an embodiment of an image-taking apparatus of the present invention.

FIG. 1 shows a digital camera 100 which is an embodiment of an image-taking apparatus of the present invention.

FIG. 1 is a perspective view of the configuration of the digital camera which is an embodiment of the present invention. Part (a) of FIG. 1 is a view when the front of the digital camera is seen from above, and part (b) of FIG. 1 is a view when the back is seen from above.

As shown in part (a) of FIG. 1, in the digital camera 100 of this embodiment, the image of a subject is lead to a CCD solid-state imaging device arranged inside the digital camera 100 through an image-taking lens included in a lens barrel 170. In this digital camera 100, an image signal indicating a through image (live view) or a taken image is generated by the CCD solid-state imaging device to be described later, and TTL distance measurement and TTL light measurement are performed based on the image signal by a main CPU to be described later to detect the subject distance or the subject brightness.

In the TTL distance measurement, distance measurement can be performed for each of multiple distance measurement areas obtained by two-dimensionally dividing the entire area covering an imaging angle of view. In the TTL light measurement also, light measurement can be performed for each of multiple light measurement areas obtained by two-dimensionally dividing the entire area covering an imaging angle of view. Here, description will be made below on the assumption that one light measurement area and one distance measurement area correspond to each other.

Furthermore, in the digital camera 100 of this embodiment, when a picture is taken, independently controlled fill light is emitted to each of the multiple emission areas which are both the light measurement areas and the distance measurement areas, from a light emission section for emitting fill light, through a fill light emission window 160, in various light distributions.

As shown in part (b) of FIG. 1, on the back and the top of the digital camera 100 of this embodiment, there is provided an operation switch group 101 for a user to perform various operations when using the digital camera 100.

The operation switch group 101 includes a cross key 101b, a menu/OK key 101c, a cancel key 101d, a mode lever 101e and the like in addition to a power switch 101a for causing the digital camera 100 to operate. By the mode lever 101e of the switch group, switching between a replay mode and an imaging mode, and switching between an animation mode and a still-image mode in the imaging mode are performed. When the mode lever 101e is switched to the imaging mode, a through image is displayed. When a user presses a release button 102 while viewing the through image, a picture of a subject is taken. When the mode lever 101e is switched to the replay mode, the taken image is reproduced and displayed on an LCD panel 150.

In this digital camera 100, the imaging mode is provided with various AF modes such as an area selection AF mode and an auto-area AF mode. When the area selection AF mode among the AF modes is selected by operating the menu/OK key 101c while the mode is switched to the imaging mode, auxiliary dividing lines 1500 dividing the entire area covering an imaging angle of view into multiple areas are displayed on the LCD panel 150 together with a through image, as shown in part (b) of FIG. 1. In this condition, when the user selects any area among the divided distance measurement areas 1501 by operating the cross key 101b, the selected area is set as a distance measurement area where distance measurement is to be performed (hereinafter also referred to as an AF area).

In the image-taking apparatus of this embodiment, a light measurement/distance measurement CPU to be described later can cause a light emission section to be describe later to emit fill light toward a subject according to brightness of field, via communication between the light measurement/distance measurement CPU and the main CPU to be described later. The light emission section of this embodiment is provided with multiple LEDs, and the amount of light of each LED is controlled by a light control section to be described later so that fill light can be emitted to a subject in various light distributions.

The release button 102 has two operation stages: half-pressing and full-pressing. When it is half-pressed, both of TTL light measurement and TTL distance measurement are performed, a diaphragm with an aperture corresponding to the light measurement value is set at the optical axis, and a focus lens is arranged at a position based on the result of distance measurement within a focus area. Then, in response to a full-pressing operation, an electronic shutter is set for the imaging device, and exposure is performed to take a picture. If it is determined that emission of fill light is necessary when half-pressing is performed, then independently controlled fill light is emitted toward each of the emission areas, which are both light measurement areas and distance measurement areas, corresponding to the divided areas 1501 shown in part (b) of FIG. 1 through the fill light emission window 160 when full-pressing is performed. Fill light includes actually emitted light and pre-emitted light which is emitted prior to the actual emission. The actual emission is performed with the amount of emitted light calculated based on the amount of reflected light of pre-emission.

Figure 2:
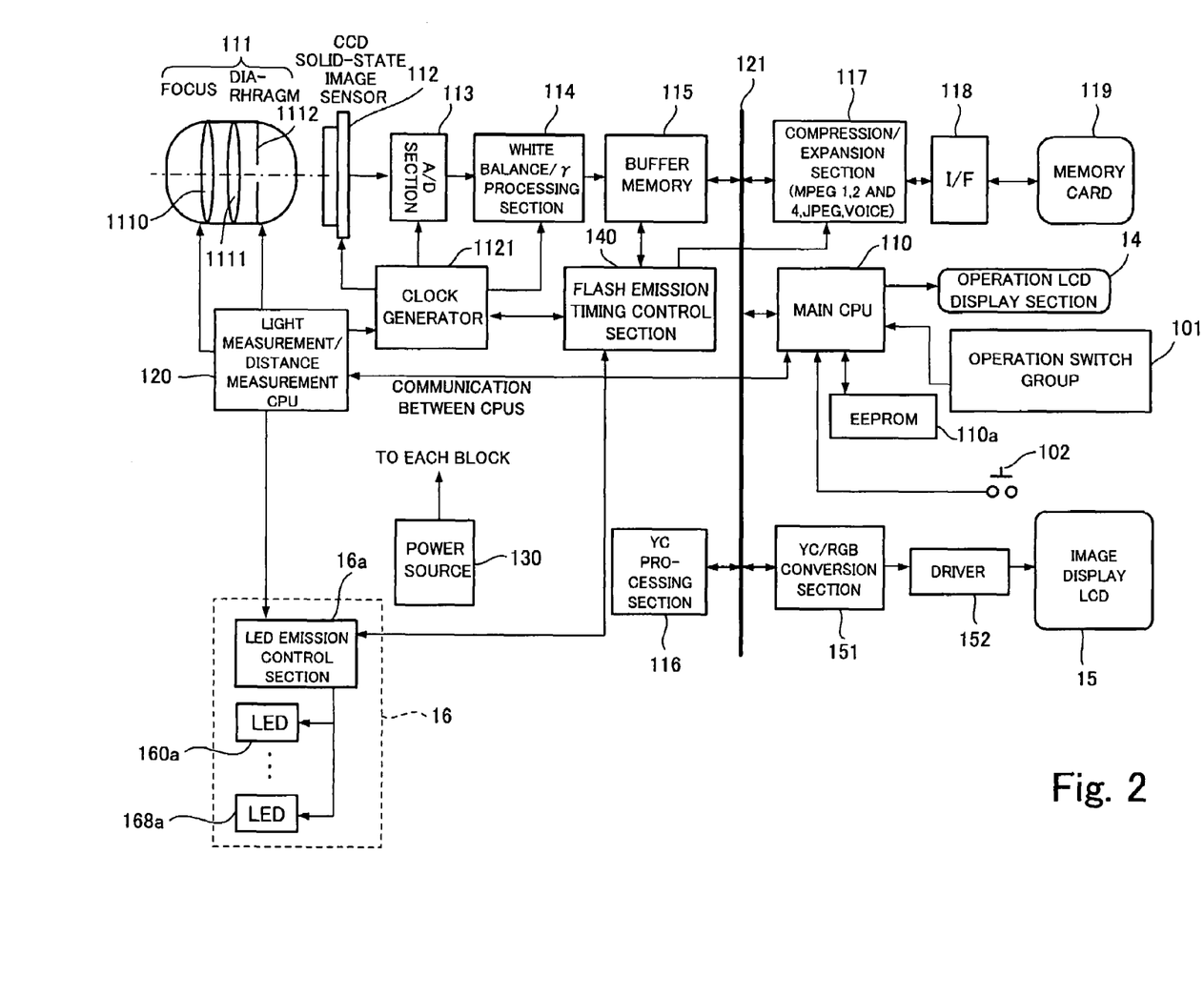
FIG. 2 is a configuration block diagram of a signal processing section arranged inside the digital camera in FIG. 1.

FIG. 2 is a configuration block diagram of a signal processing section arranged inside the digital camera 100 in FIG. 1.

The configuration of the signal processing section in the digital camera 100 will be described with reference to FIG. 2.

In the digital camera 100 of this embodiment, all processings are controlled by a main CPU 110, and each of operation signals from the operation switch group 101 shown part (b) of FIG. 1 is provided to an input section of this main CPU 110. The main CPU 110 has an EEPROM 110a. In this EEPROM 110a, a program necessary for operating as the digital camera 100 is written. When the power switch 101a of the digital camera with such a configuration is turned on, overall control of the operation of the entire digital camera 100 is performed by the CPU 110 in accordance with the program in the EEPROM 110a.

First, the flow of an image signal will be described with reference to FIG. 2.

When the power switch 101a (see FIG. 1) is turned on, it is detected by the main CPU 110 that the power switch 101a has been turned on, and power is provided from a power source 130 to each of blocks such as the main CPU 110 and a light measurement/distance measurement CPU 120. If the mode lever 101e (see FIG. 1) has been switched to the imaging side when the power source 130 is turned on, image signals representing a subject image formed on a CCD solid-state imaging device 112 are outputted at a predetermined interval while a part of them are thinned out. A subject, image based on the outputted signals is displayed on the LCD panel 150 of an image display LCD 15. To the CCD solid-state imaging device 112, timing signals are provided from a clock generator (hereinafter referred to as a CG) 1121, and the image signals are outputted at a predetermined interval by the timing signals while a part of them are thinned out. This CG 1121 outputs a timing signal based on an instruction from the main CPU 110, and the timing signal is also provided to the subsequent stages, an A/D section 113 and a white balance/γ processing section 114, in addition to the CCD solid-state imaging device 112. Accordingly, at the CCD solid-state imaging device 112, the A/D section 113 and the white balance/γ processing section 114, processing of the image signal is smoothly performed in synchronization with the timing signal in good order.

After the processing is performed in good order at the A/D section 113 and the white balance/γ processing section 114 in synchronization with the timing signal outputted from the CG 1121 in response to an instruction from the CPU 110 as described above, the image signal is provided from the white balance/γ processing section 114 to a YC processing section 116 via a bus 121. In providing the image signals via the bus 121, if the image signals sequentially processed at and outputted from the white balance/γ processing section 114 are immediately transferred to the YC processing section 116 via the bus 121, a gap may be caused in the processing timing between the white balance/γ processing section 114 and the YC processing section 116. Therefore, there is provided a buffer memory 115 as the subsequent stage so that the timing for provision to the YC processing section 116 can be adjusted. From the buffer memory 115, an image signal stored earlier is provided to the YC processing section 116 earlier. The image signal provided for the YC processing section 116 is converted from an RGB signal to a YC signal, and then the converted YC signal is provided to the image display LCD 15 via a bus 121. As the previous stage of the image display LCD 15, there is a YC/RGB conversion section 151 for converting a YC signal to an RGB signal. The YC signal is again converted to an RGB signal by this YC/RGB conversion section 151, and the converted RGB signal is provided to the image display LCD 15 via a driver 152. A subject image is displayed on the LCD panel 150 of the image display LCD 15 based on the provided RGB signal. Since the CCD solid-state imaging device 112, the A/D section 113 and the white balance/γ processing section 114 operate in synchronization with the timing signal outputted from the CG 1121 described above, and an image signal generated by the CCD solid-state imaging device 112 is processed at a predetermined interval, there is continuously displayed an image of a subject, which exists in the direction at which the image-taking lens is pointed as a subject image, on the LCD panel 150 of the image display LCD 15. When the user presses the release button 102 at the right moment to release the shutter while visually checking the continuously displayed subject image, all the image signals formed on the CCD solid-state imaging device 112 are outputted as an RGB signal when a predetermined time period elapses after the release button 102 being pressed. The RGB signal is converted to a YC signal by the YC processing section 116, and the YC signal is compressed by a compression/expansion section 117. Then, the compressed image signal is recorded in a memory card 119. In this compression/expansion section 117, as for a still image, compression is performed in a compression method in accordance with the JPEG standard, and an image signal is recorded in the memory card 119. In the header portion, compression information, imaging information and the like are written. When the mode lever 101e of the digital camera 100 is switched to the replay side, the header of the file is read from the memory card 119 first, and the compressed image signal in the file is expanded based on the compression information in the header so that the image signal is restored to the original condition. Then, a subject image based on the image signal is displayed on the LCD panel 150.

The digital camera 100 of this embodiment is provided with the light measurement/distance measurement CPU 120 for performing focus adjustment and exposure adjustment, in addition to the main CPU 110, and position control and diaphragm switching control of a focus lens of the image-taking optical system is performed by this light measurement/distance measurement CPU 120.

Furthermore, the main CPU 110 sends an instruction to this light measurement/distance measurement CPU 120 to control an LED emission control section 16a to cause multiple LEDs 160a to 168a so that actual emission and pre-emission can be performed. The main CPU 110 causes the light emission section 16 to perform pre-emission toward a subject prior to actual emission. The main CPU 110 calculates the amount of light to be emitted at actual emission based on the amount of reflected light of the pre-emission and causes the light emission section 16 to perform actual emission with the calculated amount of emitted light. In this case, the main CPU 110 causes the LED emission control section 16a to independently control each of the multiple LEDs 160a to 168a and causes a part of the multiple LEDs 160a to 168a to emit a relatively large amount of light in comparison with the amount of light of the other LEDs when pre-emission is performed. Thereby, a relatively large amount of light is emitted to a part of the multiple emission areas in comparison with the other emission areas.

In this embodiment, a fill light (flash) emission timing control section 140 is provided to synchronize the emission timing with a timing of image frame processing.

In focus adjustment, if a center-point-fixed mode, for example, among the AF modes is specified, a distance measurement area for the center point is selected as a distance measurement area where distance measurement is to be performed (AF area), and the focus lens is driven based on the result of distance measurement within the selected distance measurement area. In the case where the auto-area AF mode is specified, subject contrast is detected for each of the multiple distance measurement areas divided by the auxiliary dividing lines 1500 shown in part (b) of FIG. 1, and an area with the highest subject contrast is regarded as the distance measurement area where distance measurement is to be performed (AF area). The focus lens is driven to a position corresponding to the result of distance measurement within the AF area. In the case where the area selection AF mode mentioned above is specified, distance measurement is performed in an AF area selected according to an operation, and the focus lens 1110 is driven to the position corresponding to the result of the distance measurement.

In exposure adjustment, the result of light measurement of the AF area and the result of light measurement of the other areas are communicated from the main CPU 110 to the light measurement/distance measurement CPU 120, and the light measurement/distance measurement CPU 120 calculates, for example, an average brightness. By the aperture size of a diaphragm 1112 being adjusted according to the calculated brightness, the amount of light to be given to the imaging surface of the CCD solid-state imaging device 112 is adjusted.

Furthermore, in the digital camera 100 of this embodiment, in response to an instruction from the main CPU 110, the light measurement/distance measurement CPU 120 controls the LED emission control section 16a according to the light measurement result, the distance measurement result or the imaging mode to cause the LED emission control section 16a to emit fill light. The LED emission control section 16a is provided with nine LEDs 160a to 168a as multiple light-emitting elements, and the amount of light of each of the LEDs 160a to 168a is adjusted by the LED emission control section 16a. In this embodiment, the LEDs 160a to 168a are responsible for emission to nine emission areas 1601a to 1681a, respectively. Here, the LED emission control section 16a independently controls the amount of fill light for each area by changing the volume applied to each of the LEDs 160a to 168a to adjust the amount of light or changing the duty ratio of a driving signal to control the amount of light, and thereby it adjusts light distribution and causes emission of fill light toward a subject.

Here, the amount of light can be adjusted. However, it is also possible to control on and off by applying voltage to each LED or not. For example, it is possible to, in order to cause a part of the multiple LEDs 160a to 168a to emit a large amount of light, stop emission of the other LEDs except for the part of the LEDs, that is, set the amount of light to zero for them.

Figure 3:
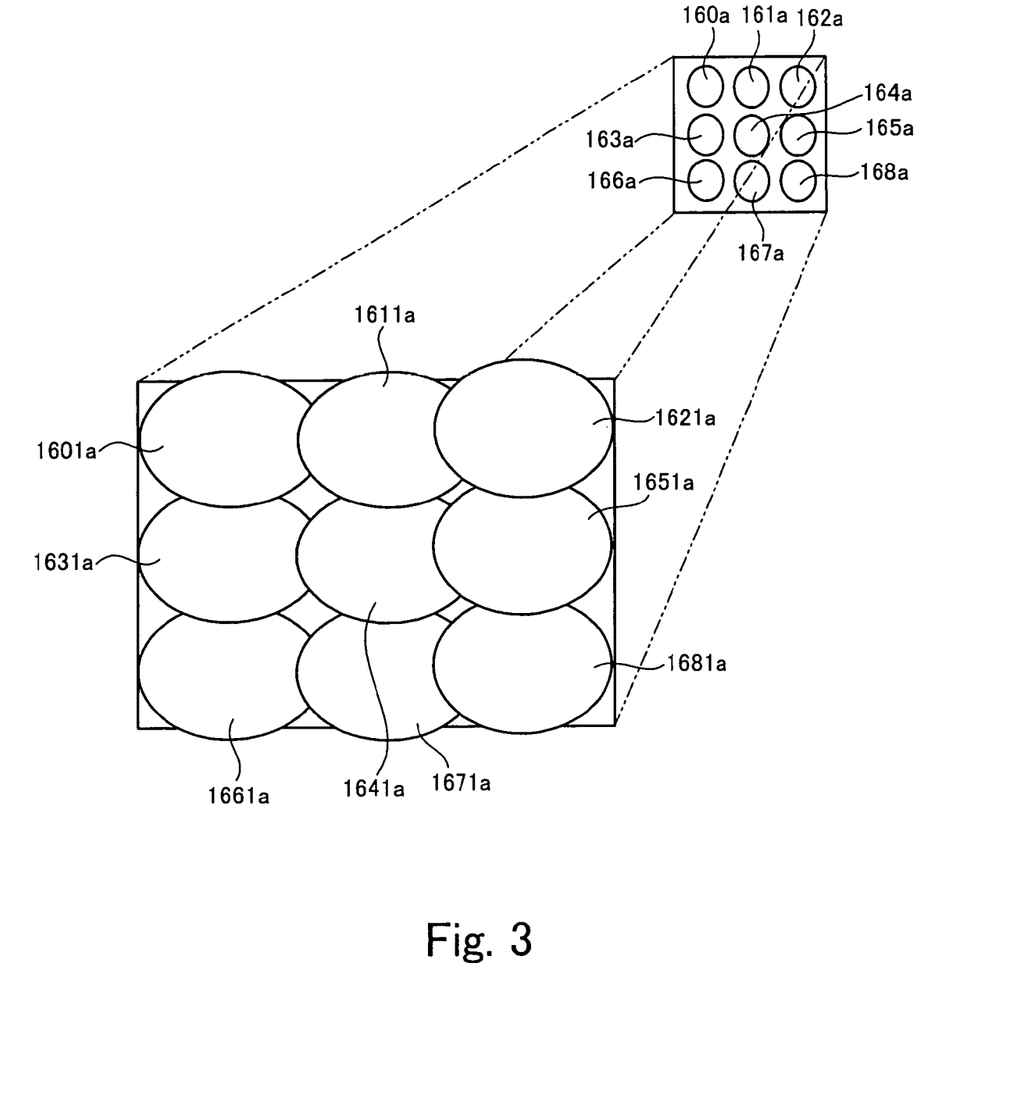
FIG. 3 shows an array of nine LEDs provided for an emission section and an array of emission areas corresponding to the LEDs, respectively.

FIG. 3 shows a subject area (as what indicates an imaging angle of view) captured by an image-taking optical system included in the lens barrel 170 of the digital camera 100 shown in FIG. 1. FIG. 3 shows correspondence relation between an array of the nine LEDs 160a to 168a provided in the emission section and an array of the emission areas 1601a to 1681a corresponding to the LEDs, respectively.

As shown in FIG. 3, from each of the multiple LEDs 160a to 168a, independently controlled fill light is emitted toward a corresponding emission area among the multiple emission areas 1601a to 1681a obtained by two-dimensionally dividing the entire area covering an imaging angle of view.

Figure 4:
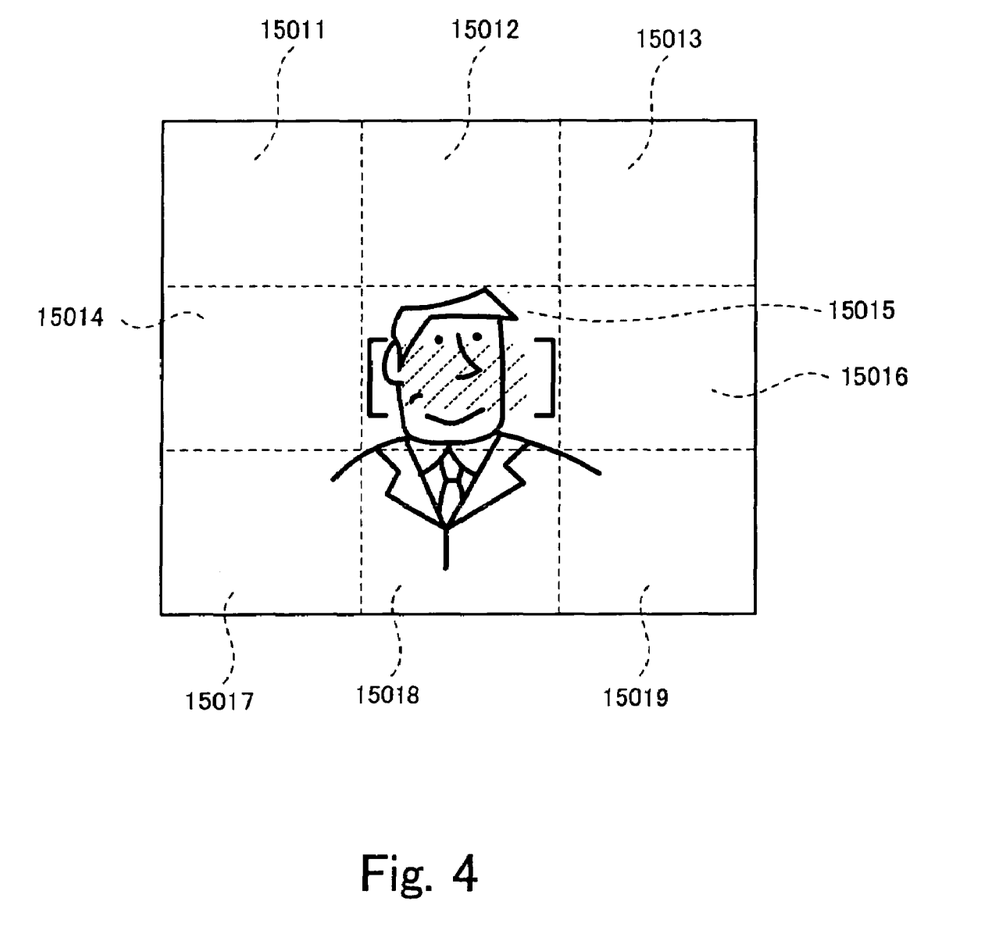
FIG. 4 shows multiple distance measurement areas obtained by two-dimensionally dividing the entire area covering an imaging angle of view.

FIG. 4 shows multiple distance measurement areas 15011, 15012, 15013, 15014, 15015, 15016, 15017, 15018 and 15019 obtained by two-dimensionally dividing the entire area covering an imaging angle of view. In both of FIGS. 3 and 4, there is shown an example of dividing the entire area covering the imaging angle of view into 3×3=9.

As shown in FIGS. 3 and 4, the emission areas correspond to the distance measurement areas, respectively, in one-to-one relation. For example, in the case where the auto-area AF mode is specified by an operation, a relatively large amount of light is emitted to an emission area corresponding to the distance measurement area where distance measurement has been performed by the main CPU 110, among the emission areas 1601a, 1611a, 1621a, 1631a, 1641a, 1651a, 1661a, 1671a and 1681a shown in FIG. 3, when pre-emission is performed.

Here, main processing in the program stored in the EEPROM 110a will be described, and then, details of exposure processing related to actual emission and pre-emission in the main processing will be described.

First, the main processing performed by the main CPU 110 will be described with reference to FIG. 5.

Figure 5:
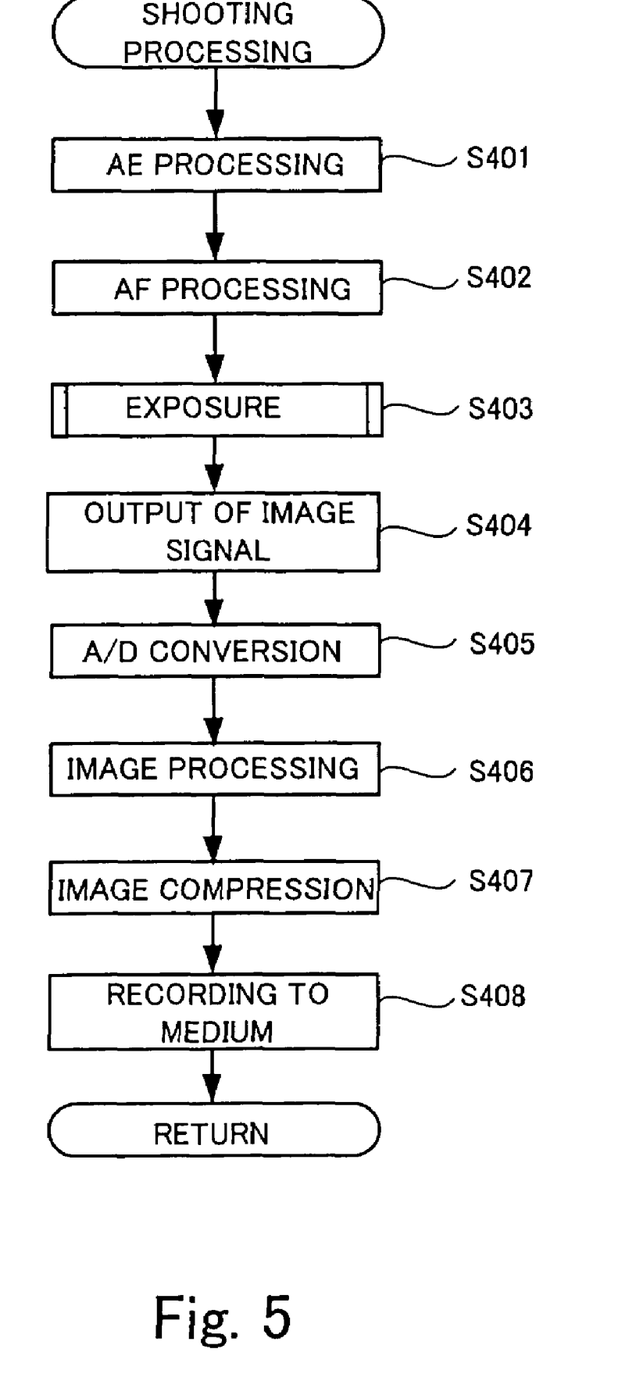
FIG. 5 is a flowchart showing a procedure of main processing performed by a main CPU when a picture is taken by emitting fill light to a subject.

FIG. 5 is a flowchart showing a procedure of the main processing performed by the main CPU 110 when a picture is taken by emitting fill light to a subject.

When the release button 102 is half-pressed at step S401, AE processing, that is, TTL light measurement is performed, and the light measurement/distance measurement CPU 120 is caused to adjust the aperture of the diaphragm 1112 based on the result. At the next step S402, AF processing is performed. Since the image-taking apparatus of this embodiment has various AF modes such as center-point-fixed mode, area selection AF mode and auto-area AF mode, the AF processing of step S402 makes it possible: to detect a focus point which is most appropriate in each area by performing brightness sampling for each area thereby determining subject contrast for each area; to detect a focus point only in a selected area; or to detect a focus point only in the central area.

Here, in performing the AF processing, the light measurement/distance measurement CPU 120 is instructed to move the focus lens; subject contrast sampling is performed for a predetermined distance measurement area to detect a focus point and measure the distance to the subject while the focus lens is being moved; the subject distance obtained by distance measurement is notified to the light measurement/distance measurement CPU 120; and the light measurement/distance measurement CPU 120 is caused to move the focus lens 1110 to the focus point position based on such AF information, no matter which AF mode is selected. At the subsequent step S403, when the timing of a full-pressing operation of the release button 102 is detected, the detected timing is notified to the light measurement/distance measurement CPU 120. Then, under the control of the light measurement/distance measurement CPU 120, the CG 1121 is caused to provide an exposure start signal to the CCD solid-state imaging device 112 to cause the CCD solid-state imaging device 112 to start exposure. If it is necessary to emit fill light when the CCD solid-state imaging device 112 is caused to start exposure, then, at step S403, the amount of light according to the notified distance measurement area is calculated, and the light measurement/distance measurement CPU 120 is caused to perform pre-emission by each of the LEDs 160a to 168a with the calculated amount of light. In this case, to an emission area corresponding to the distance measurement area where distance measurement has been performed, a relatively large amount of light is emitted in comparison with the other emission areas. When the CCD solid-state imaging device 112 is caused to receive light reflected from the subject by pre-emission, and information about the amount of the light reflected from the subject is provided to the main CPU 110, the main CPU 110 calculates the amount of light to be emitted at actual emission and again causes the LED emission control section 16a to perform actual emission by each of the LEDs 160a to 168a with the calculated amount of light via the light measurement/distance measurement CPU 120.

Furthermore, while actual emission toward the subject is performed with the light from the LEDs, time integration of the amount of light reflected from each area is performed. When the time integration value reaches a predetermined value, emission is stopped.

In this way, light adjustment is performed, and emission to each area is stopped when the amount of emitted light reaches an appropriate value. Then, at step S403, when exposure ends, an exposure end signal is provided from the CG 1121 to the CCD solid-state imaging device 112 to close an electronic shutter. At the next step S404, an image signal is outputted from the CCD solid-state imaging device 112 to the A/D section 113. At step S405, the A/D section 113 is caused to convert the analog image signal to a digital image signal and provide the signal to the white balance/γ processing section 114. At step S406, the white balance/γ processing section 114 is caused to perform image processing and output the image-processed image signal to the buffer memory 115. The image signal outputted from the buffer memory 115 is provided to the YC processing section 116 at an appropriate timing to be image-processed by the YC processing section 116. Then, at the next step S407, after the compression/expansion section 117 is caused to perform image compression, an I/F 118 is caused to record the signal in the memory card 119, and the processing of this flow ends.

Here, since the digital camera 100 of this embodiment prevents increase in power consumption by emitting a relatively large amount of light to a part of emission areas in comparison with the other emission areas when pre-emission is performed, details of the exposure processing of step S403 will be described.

Figure 6:
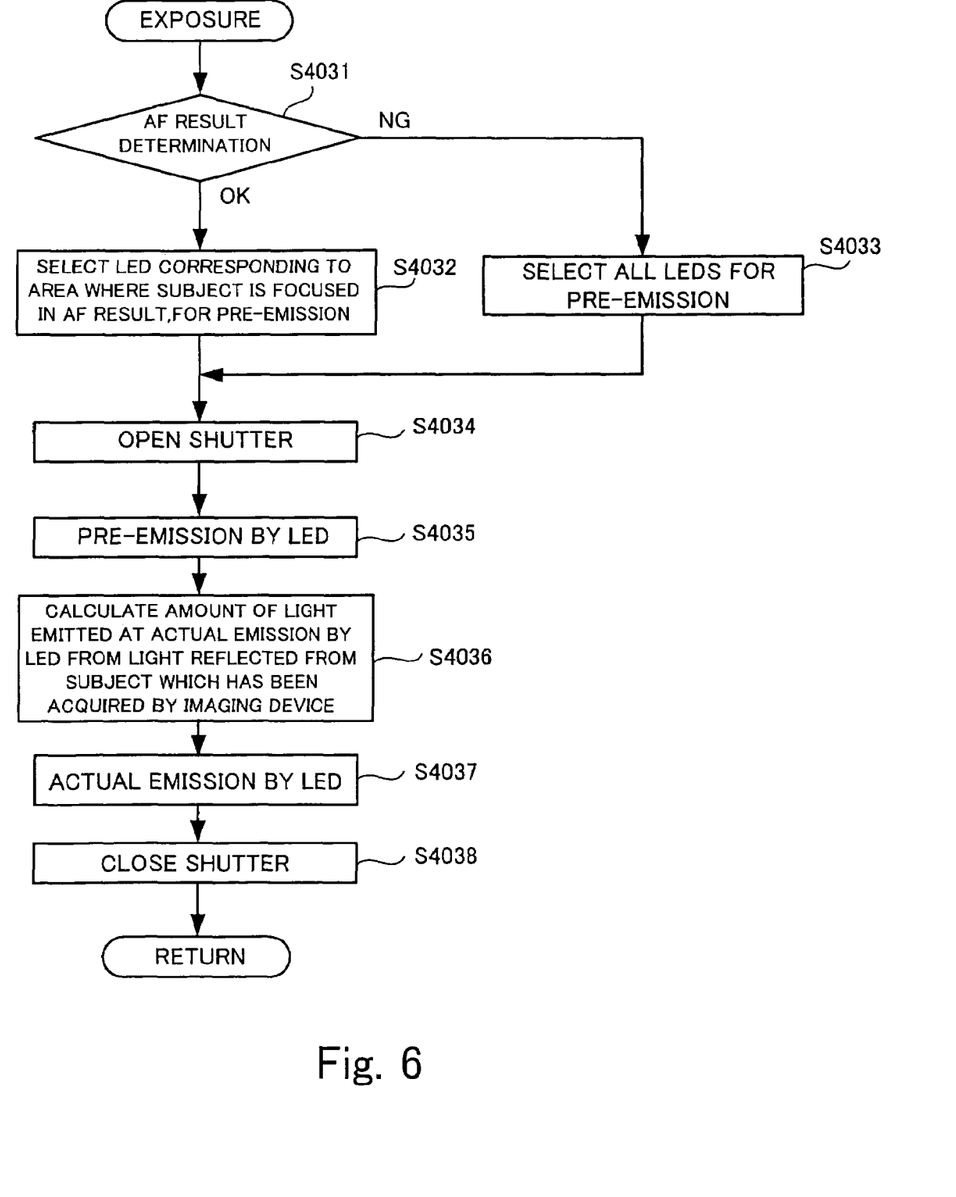
FIG. 6 is a flowchart showing details of exposure processing.

FIG. 6 is a flowchart showing the details of the exposure processing of step S403.

At step S4031, AF result determination processing is performed in response to a full-pressing operation. At this step, it is determined whether or not distance measurement has been appropriately performed in a distance measurement area for performing distance measurement at the AF processing of step S402 and the subject has been focused. If it is determined that distance measurement has been appropriately performed and the subject has been focused, that is, if the OK route is taken from step S4031, then the process proceeds to step S4032, where the LED responsible for emission to an emission area corresponding to the distance measurement area where distance measurement has been performed is set to emit a large amount of light, and the LEDs responsible for emission to the other emission areas are set to each emit a small amount of light. Information about this setting is provided to the light measurement/distance measurement CPU 120, and the process proceeds to step S4034. For example, in the example in FIG. 4, in the distance measurement area 15015 which is positioned at the center among the nine distance measurement areas 15011 to 15019, distance measurement has been appropriately performed, and a subject has been focused. In this case, the LED 164a which is responsible for emission to the emission area 1641a (FIG. 3) corresponding to the distance measurement area 15015 where distance measurement has been performed is set to emit a large amount of light, and the other LEDs 160a to 163a and 165a to 168a are set to each emit a small amount of light or set so that the amount of light is zero. This is because it is generally sufficient if the amount of light emitted at actual emission, which is performed almost uniformly in an imaging angle of view, is adjusted to be appropriate for the distance measurement area 15015 where the subject is focused best. If it is determined that distance measurement has not been appropriately performed, and the subject has not been focused, that is, if the NG route is taken from step S4031, then the process proceeds to step S4033 since there is not a distance measurement area where distance measurement has been performed, where all the LEDs are set to each emit a large amount of light. Information about this setting is provided to the light measurement/distance measurement CPU 120. The process proceeds to step S4034.

At step S4034, via the light measurement/distance measurement CPU 120, the clock generator 1121 is caused to provide an exposure start signal to the CCD solid-state imaging device 112 to open the electronic shutter. At the next step S4035, each of the LEDs 160a to 168a is caused to emit the set amount of light to as pre-emitted light toward the subject. If the digital camera 100 is provided with a mechanic shutter, the mechanic shutter is also opened and closed in conjunction with opening and closing of the electronic shutter. In this case, the amount of light required for calculation of the amount of light emitted at actual emission is secured in the emission area 1641a corresponding to the distance measurement area 15015 where distance measurement has been performed, and the amount of light to be emitted to each of the other emission areas 1601a to 1631a and 1651a to 1681a is low or zero.

At the next step S4036, the CCD solid-state imaging device 112 is caused to receive light reflected from each area, and the optimum amount of light to be emitted at actual emission is calculated according to the received amount of light. In this case, by calculating the amount of light based on a part of the reflected light to be received by the CCD solid-state imaging device 112, that is, the part reflected from an emission area set to be emitted with a large amount of light, for example, the emission area 1641a in FIG. 4, the amount of light to be emitted at actual emission which is the most appropriate the focused subject is calculated.

At the next step S4037, each of the LEDs 160a to 168a is caused to emit light with the calculated amount of light toward the subject in actual emission. In the actual emission in this embodiment, naturally distributed emission is performed by causing the LEDs 160a to 168a to emit light almost uniformly.

At the next step S4038, after a predetermined time period elapses, the electronic shutter is closed, emission of the LEDs 160a to 168a is stopped, and the processing of this flow ends.

As described above, an image-taking apparatus which prevents increase in power consumption is realized.

Figure 7:
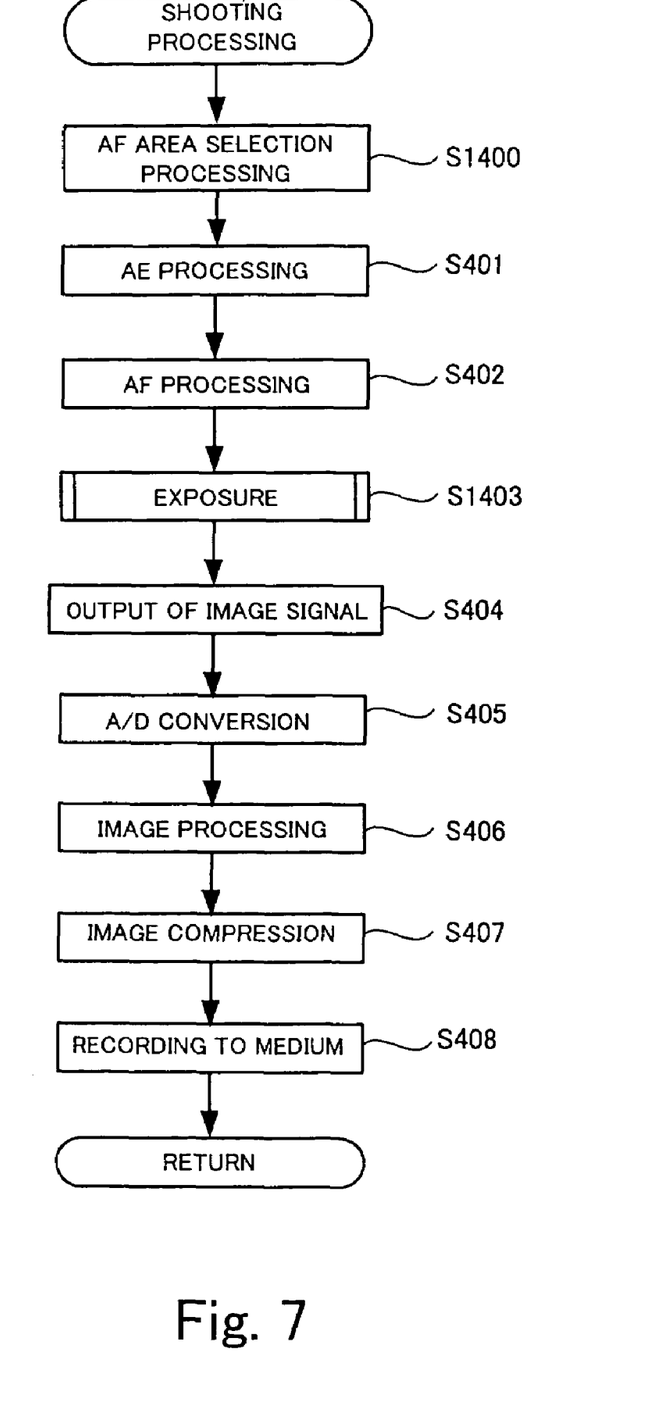
FIG. 7 is a flowchart illustrating a variation of FIG. 5.
Figure 8:
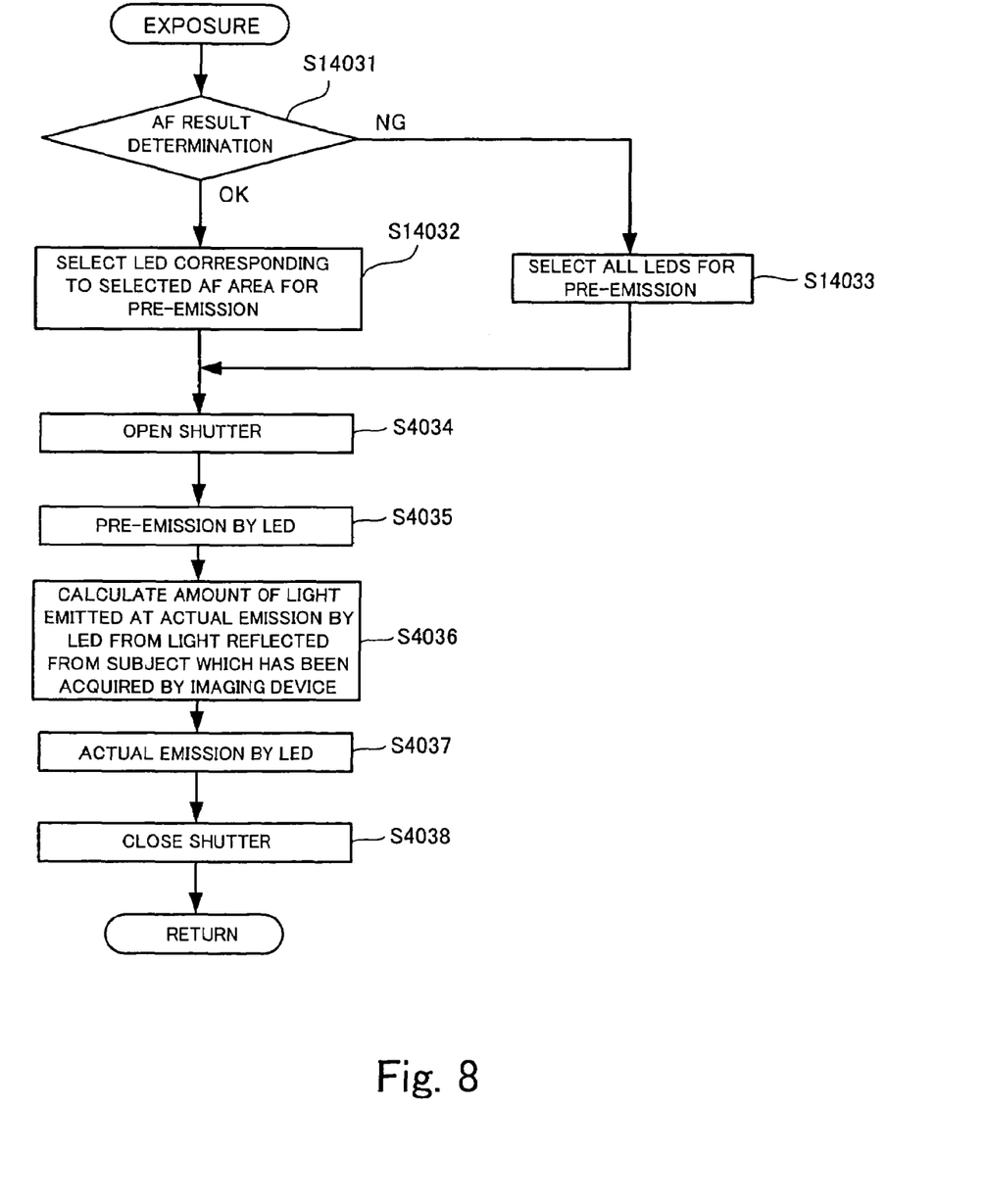
FIG. 8 is a flowchart illustrating a variation of FIG. 6.
Figure 9A:
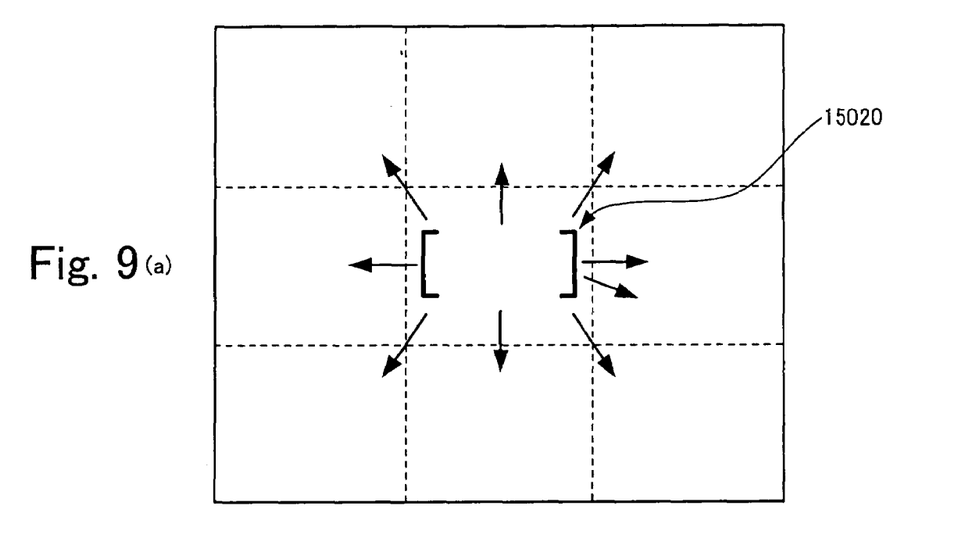
FIGS. 9A and 9B shows multiple distance measurement areas obtained by two-dimensionally dividing the entire area covering an imaging angle of view in the variation.
Figure 9B:
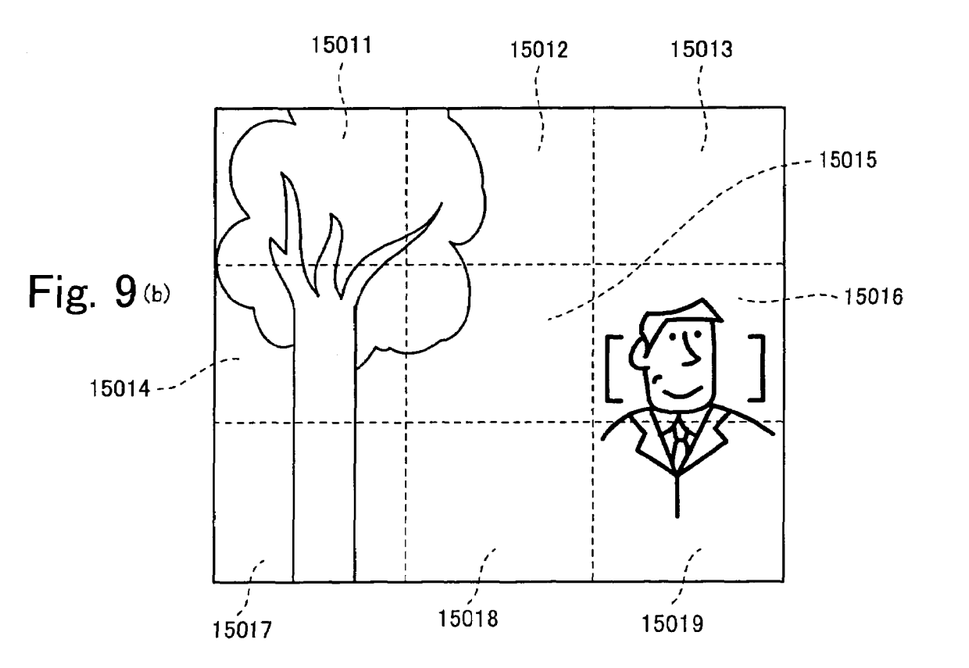

FIGS. 7 and 8 are flowcharts showing variations of FIGS. 5 and 6, respectively. FIG. 9 shows, in each of part (a) and (b), multiple distance measurement areas obtained by two-dimensionally dividing the entire area covering an imaging angle of view. In this variation, an area selection mode is realized in which a distance measurement area is selected according to an operation, and distance measurement is performed for the selected distance measurement area.

The main CPU 110 of the digital camera first performs AF area selection processing at step S1400 in FIG. 7. In this processing, when the cross key 101b is operated by a user, a distance measurement area where distance measurement is to be performed is selected according to this operation. For example, there are nine distance measurement areas to be selected as shown in part (a) of FIG. 9, and the user can arbitrarily specify a distance measurement area where distance measurement is to be performed by operating the cross key 101b and moving the display position of a cursor 15020. Part (b) of FIG. 9 shows that the distance measurement area 15016 is selected as a result of the operation. Since the other processings shown in FIG. 7 are the same as the processings shown in FIG. 5, the same reference numerals are given thereto, and description thereof will be omitted.

FIG. 8 is a flowchart showing the details of the exposure processing of step S1403.

At step S14031, the main CPU 110 of the digital camera performs AF result determination processing in response to a full-pressing operation. At this step, it is determined whether or not, in the distance measurement area selected at step S1400, distance measurement by the AF processing of step S402 shown in FIG. 7 has been appropriately performed and a subject is focused. In this case, if it is determined that distance measurement has been appropriately performed and the subject is focused, that is, if the OK route is taken from step S14031, then the process proceeds to step S14032. At this step, the LED responsible for emission to an emission area corresponding to the distance measurement area where distance measurement has been performed is set to emit a large amount of light, and the LEDs responsible for emission to the other emission areas are set to each emit a small amount of light. Information about this setting is provided to the light measurement/distance measurement CPU 120, and the process proceeds to step S14034. For example, in the example shown in FIG. 9, distance measurement has been appropriately performed in the distance measurement area 15016 selected among the nine distance measurement areas 15011 to 15019, and a subject in the distance measurement area 15016 is focused. In this case, the LED 163a responsible for emission to the emission area 1631a (FIG. 3) corresponding to the distance measurement area 15016 is set to emit a large amount of light, and the other LEDs 160a to 162a and 164a to 168a are set to each emit a small amount of light. On the other hand, if it is determined that distance measurement has not been appropriately performed and a subject is not focused, that is, the NG route is taken from step S14031, then the process proceeds to step S4033, and all the LEDs 160a to 168a are set to each emit a large amount of light. Information about this setting is provided to the light measurement/distance measurement CPU 120. The process proceeds to step S4034. Since the processing at and after step S4034 is the same as the processing shown in FIG. 6, the same reference numerals are given to steps, and description thereof will be omitted.

As described above, since the main CPU 110 selects a distance measurement area according to an operation, the user can specify a distance measurement area. By emitting a large amount of light to an emission area corresponding to the specified distance measurement area and emitting a relatively small amount of light to each of the other emission areas, it is possible to prevent increase in power consumption while sufficiently securing the amount of light emitted to the area specified by the user at pre-emission.

Operation of the cross key 101b has been described as an example of a method for selecting a distance measurement area. However, other methods can be also used to select a distance measurement area. For example, so-called line-of-sight-input can be also used in which a line-of-sight detection section for detecting a line of sight is provided near a finder eyepiece window on the back of the digital camera, and a distance measurement area corresponding the line of sight of the user looking into the finder, which is detected by the line-of-sight detection section, is selected.

Figure 10:
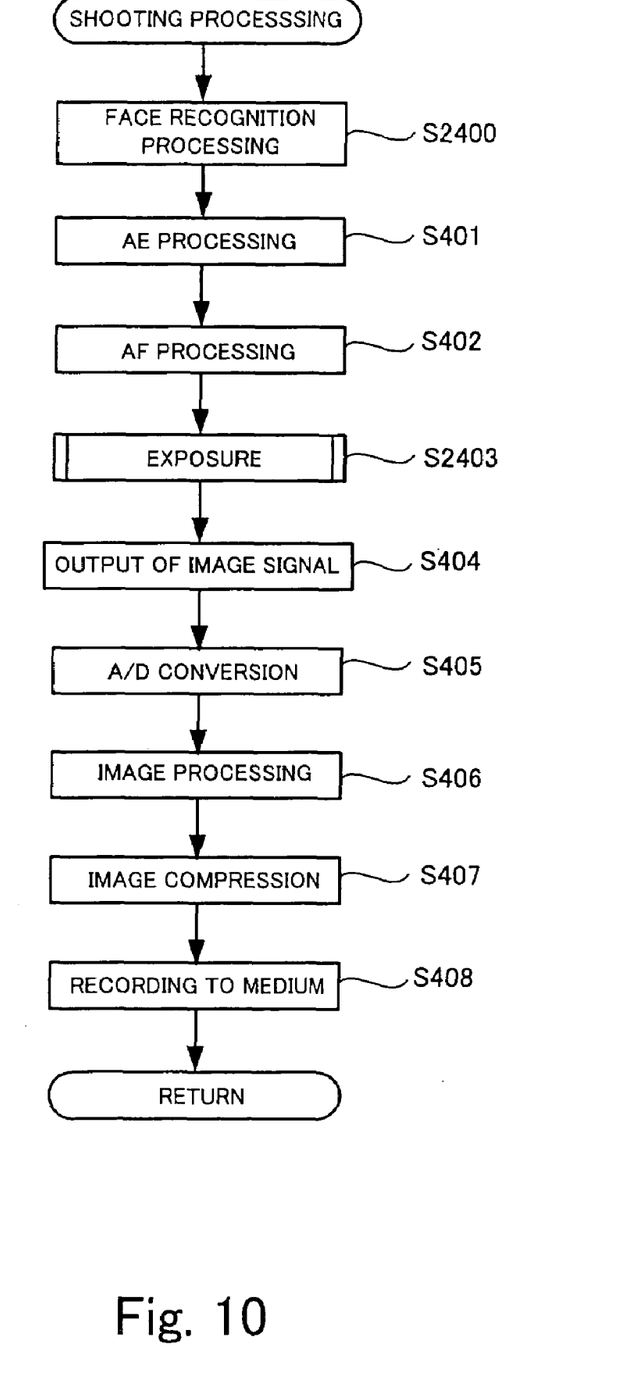
FIG. 10 is a flowchart illustrating another variation of FIG. 5.
Figure 11:
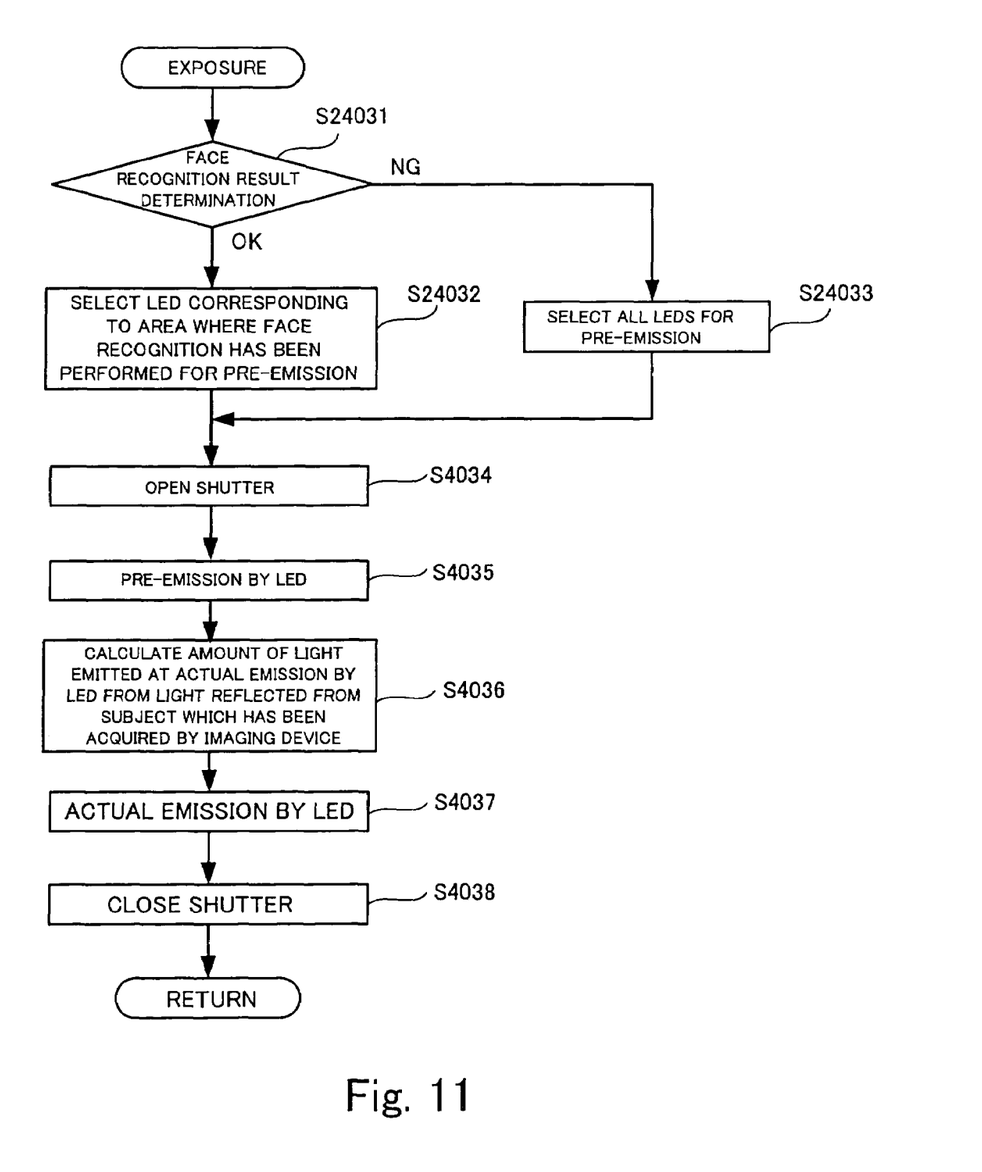
FIG. 11 is a flowchart illustrating another variation of FIG. 6.
Figure 12:
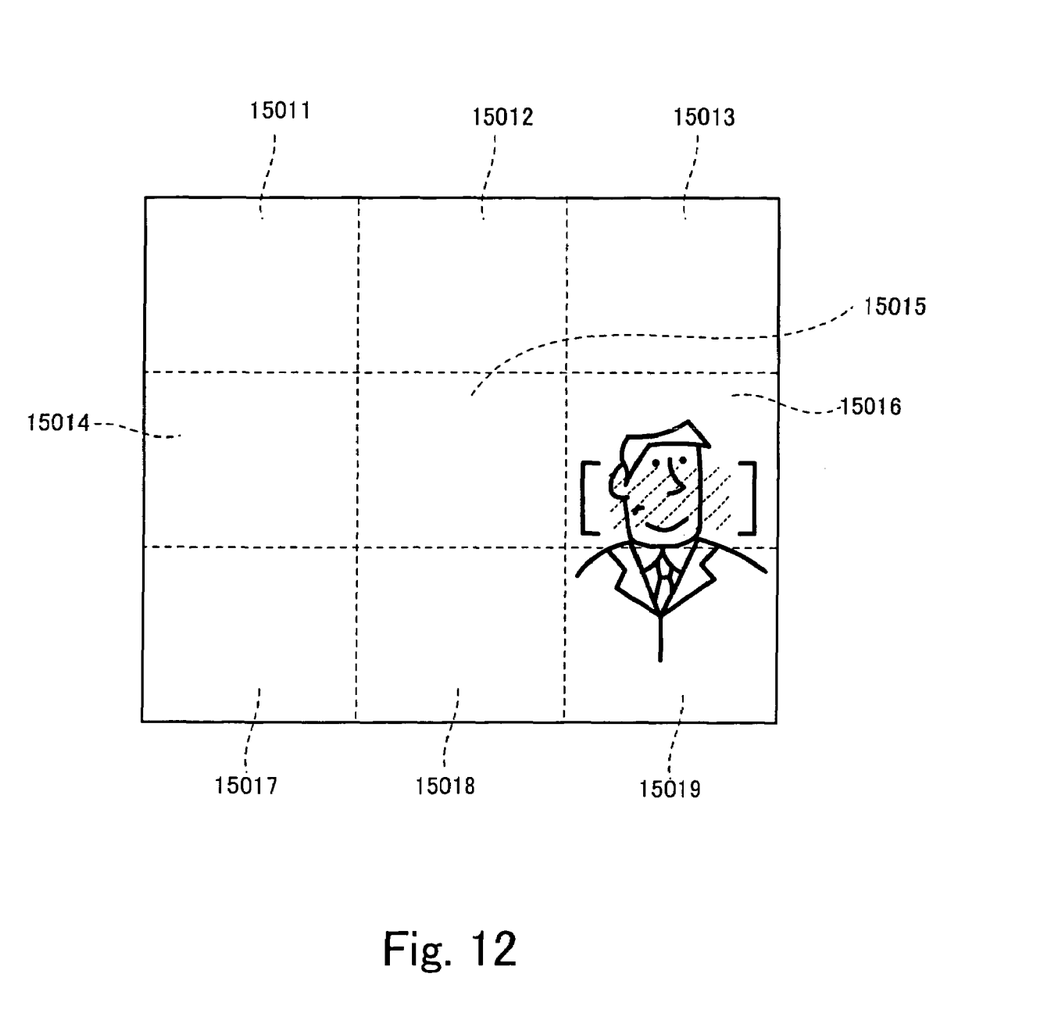
FIG. 12 shows multiple distance measurement areas obtained by two-dimensionally dividing the entire area covering an imaging angle of view in that other variation.

FIGS. 10 and 11 are flowcharts showing another variations of FIG. 5 and FIG. 6, respectively. FIG. 12 shows multiple distance measurement areas obtained by two-dimensionally dividing the entire area covering an imaging angle of view. The digital camera according to this variation recognizes a face position by image processing, and emits a relatively large amount of light to an emission area corresponding to the recognized face position when pre-emission is performed.

The main CPU 110 of the digital camera first performs face recognition processing of step S2400. In this processing, a face position is recognized by reading an image signal generated by the CCD solid-state imaging device 112 and performing image processing. For example, as shown in FIG. 12, when an image of a face is recognized in the distance measurement area 15016 among the nine distance measurement areas by the face recognition processing, this distance measurement area 15016 is selected as a distance measurement area where distance measurement is to be performed. Since the other processings of the flowchart shown in FIG. 10 are the same as the processings in FIG. 5, the same reference numerals are given thereto, and description thereof will be omitted.

FIG. 11 is a flowchart showing details of exposure processing of step S2403.

At step S24031, face recognition determination processing is performed in response to a full-pressing operation. At this step, it is determined whether or not face recognition has been appropriately performed and selection of a distance measurement area corresponding to a face position has been selected at the AF processing of step S2400 shown in FIG. 10. If it is determined that face recognition has been appropriately performed, that is, if the OK route is taken from step S24031, then the process proceeds to step S24032, where the LED responsible for emission to an emission area corresponding to the selected emission area is set to emit a large amount of light, and the LEDs responsible for emission to the other emission areas are set to each emit a small amount of light. Information about this setting is provided to the light measurement/distance measurement CPU 120, and the process proceeds to step S14034. In the example shown in FIG. 12, distance measurement has been appropriately performed in the distance measurement area 15016 selected from among the nine distance measurement areas 15011 to 15019, and a subject is focused in the distance measurement area 15016. In this case, the LED 163*a* responsible for emission to the emission area 1631*a* (FIG. 3) corresponding to the distance measurement area 15016 is set to emit a large amount of light, and the other LEDs 160*a* to 162*a* and 164*a* to 168*a* are set to each emit a small amount of light. On the other hand, if it is determined that face recognition has not been appropriately performed, that is, if the NG route is taken from step S24031, then the process proceeds to step S24033, where all the LEDs 160*a* to 168*a* are set to each emit a large amount of light. Information about this setting is provided to the light measurement/distance measurement CPU 120, and the process proceeds to step S4034. Since the processings at and after step S4034 are the same as the processings in FIG. 6, the same reference numerals are given thereto, and description thereof will be omitted.

As described above, the main CPU 110 recognizes a face position by image processing and causes a relatively large amount of light to be emitted to an emission area corresponding to the recognized face position. In this case, the recognized face position is generally a position which attracts a lot of attention. By emitting a large amount of light to the emission area corresponding to the distance measurement area including the recognized face position and emitting a relatively small amount of light to each of the other emission areas, it is possible to prevent increase in power consumption while securing a sufficient amount of light emitted at pre-emission to a part of the subject which includes the face position.

An embodiment and its variations have been described above. Here, when the AF processing of step S402 shown in FIG. 5, 7 or 10 is executed by the main CPU 110 shown in FIG. 2, the combination of the hardware, such as the main CPU 110 and the light measurement/distance measurement CPU 120, and the AF processing of step S402 corresponds to an example of the distance measurement section of the image-taking apparatus of the present invention. When the exposure processing of step S403 shown in FIG. 5, step S1403 shown in FIG. 7 or step S2403 shown in FIG. 10 is executed by the main CPU 110, the combination of the hardware, such as the main CPU 110 and the light measurement/distance measurement CPU 120, and each exposure processing of steps S403, S1403 or S2403 corresponds to an example of the distance measurement section of the image-taking apparatus of the present invention. When the face recognition processing of step S2400 shown in FIG. 10 is executed by the main CPU 110, the combination of the hardware, such as the main CPU 110 and the buffer memory 115, and the face recognition processing of step S2400 corresponds to an example of the face recognition section of the image-taking apparatus of the present invention. When the AF area selection processing of step S1400 shown in FIG. 7 is executed by the main CPU 110, the combination of the hardware, such as the main CPU 110 and the cross key 101*b*, and the AF area selection processing of step S1400 corresponds to an embodiment of the selection section of the image-taking apparatus of the present invention.

Though the digital camera 100 has been described as an example of the image-taking apparatus in the embodiment described above, the present invention is not limited thereto but is applicable to, for example, a camera included in a mobile phone.

Though, in the embodiment described above, an example has been described in which multiple emission areas correspond to multiple distance measurement areas, respectively, in one-to-one relation, the present invention is not limited thereto. It is sufficient if each of the multiple distance measurement area as is associated with any of the emission areas.

Though description has been made on the assumption that the number of emission areas, distance measurement areas and LEDs as light-emitting elements is nine, the present invention is not limited thereto. The number of the emission areas, the distance measurement areas and the LEDs may be any number equal to or above two.

What is claimed is:

1. An image-taking apparatus which is provided with an imaging device and which forms a subject image on the imaging device to generate an image signal, the image-taking apparatus comprising:

an emission section which emits independently controlled light to each of multiple emission areas obtained by two-dimensionally dividing an entire area covering an imaging angle of view; and an emission control section which causes the emission section to perform pre-emission toward a subject prior to actual emission performed when an image is taken, calculates an amount of light to be emitted at actual emission based on an amount of reflected light of the pre-emission and causes the emission section to perform actual emission with the calculated amount of emitted light, a face recognition section which recognizes a face position by image processing, wherein the emission control section causes the emission section to emit a relatively large amount of light to a part of the multiple emission areas in comparison with the other emission areas when the pre-emission is performed, and wherein when the pre-emission is performed, the emission control section causes the emission section to emit a relatively large amount of light to an emission area corresponding to the face position recognized by the face recognition section.

2. The image-taking apparatus according to claim 1, further comprising a distance measurement section which measures a distance to a subject in at least one distance measurement area among the multiple distance measurement areas obtained by two-dimensionally dividing the entire area covering an imaging angle of view, wherein when the pre-emission is performed, the emission control section causes the emission section to emit a relatively large amount of light to an emission area corresponding to the distance measurement area where distance measurement has been performed by the distance measurement section.

3. The image-taking apparatus according to claim 2, further comprising a selection section which selects a distance measurement area in accordance with an operation, wherein the distance measurement section performs distance measurement for the distance measurement area selected by the selection section.

4. The image-taking apparatus according to claim 1, wherein the emission section comprises multiple light-emitting elements which are responsible for emission to the multiple emission areas, respectively.

* * * * *